(12) United States Patent
Choi (10) Patent No.: US 7,777,946 B2
(45) Date of Patent: Aug. 17, 2010

(54) BAG TYPE PORTABLE SCREEN DEVICE

(76) Inventor: Hae-Yong Choi, Mookdong I Park Apartment #108-301, 385 Mook-dong, Jungryang-gu, Seoul-city (KR) 131-768

( * ) Notice: Subject to any disclaimer, the term of this patent is extended or adjusted under 35 U.S.C. 154(b) by 280 days.

(21) Appl. No.: 11/878,194

(22) Filed: Jul. 23, 2007

(65) Prior Publication Data

US 2008/0204870 A1 Aug. 28, 2008

(30) Foreign Application Priority Data

| Feb. 22, 2007 | (KR) | ................ 20-2007-0003242 U |
| Mar. 21, 2007 | (KR) | ................ 20-2007-0004775 U |
| Apr. 17, 2007 | (KR) | ................ 20-2007-0006438 U |

(51) Int. Cl.
G03B 21/56 (2006.01)
A45C 13/00 (2006.01)

(52) U.S. Cl. ..................... 359/443; 190/102

(58) Field of Classification Search ............... 160/229; 353/79–80; 359/443, 461; 190/1, 102, 900
See application file for complete search history.

(56) References Cited

U.S. PATENT DOCUMENTS

| 1,813,881 | A | * | 7/1931 | Peters | .................. 160/23.1 |
| 2,450,757 | A | * | 10/1948 | Hutchison, Jr. | ............. 353/17 |
| 2,499,859 | A | * | 3/1950 | Halter | .................. 160/128 |
| 2,506,169 | A | * | 5/1950 | Perillo | .................. 353/119 |
| 3,511,555 | A | * | 5/1970 | O'Brien | .................. 359/443 |
| 3,560,088 | A | * | 2/1971 | O'Brein | .................. 353/78 |
| 3,715,155 | A | * | 2/1973 | Grupp | .................. 353/15 |
| 3,833,098 | A | * | 9/1974 | Alderman | .................. 190/11 |
| 4,130,352 | A | * | 12/1978 | Overman et al. | .............. 353/79 |
| 4,572,632 | A | * | 2/1986 | Bodier et al. | .................. 353/71 |
| 4,640,597 | A | * | 2/1987 | Okano et al. | .................. 353/79 |
| 5,343,262 | A | * | 8/1994 | Park | .................. 353/119 |
| 5,982,537 | A | * | 11/1999 | Koizumi et al. | ............. 359/444 |
| 2006/0187423 | A1 | * | 8/2006 | Hamilton et al. | .............. 353/79 |

FOREIGN PATENT DOCUMENTS

| DE | 10105481 A1 | * | 8/2002 | |
| GB | 610128 B | * | 12/1948 | |
| JP | 06082916 A | * | 3/1994 | .................. 359/443 |
| JP | 2001042437 A | * | 2/2001 | .................. 359/443 |
| JP | 2006195186 A | * | 7/2006 | .................. 359/443 |

OTHER PUBLICATIONS

Definitions of "Bag" and "Case" from Collins English Dictionary, 2000 edition, retrieved on Jan. 14, 2010 from CredoReference.com.*

* cited by examiner

Primary Examiner—Christopher E Mahoney
Assistant Examiner—Leon W Rhodes
(74) Attorney, Agent, or Firm—Bacon & Thomas, PLLC (57) ABSTRACT

A bag type portable screen device is disclosed. A screen is coupled with a rotary rod with ½ to ⅓ the size of a conventional screen to complete a screen case. The screen case is coupled with one of upper and lower sides of a bag, and has rings to fix the screen, when the rotary rod rotates to open and use the screen. The screen is released from the rings to carry. The screen may be a fixed type reflective screen whose end is fixed to the bag. Since the bag accommodates a laptop computer, and a projector, the bag type portable screen is convenient to carry, install, and use.

5 Claims, 9 Drawing Sheets

BAG TYPE PORTABLE SCREEN DEVICE

BACKGROUND OF THE INVENTION

1. Field of the Invention

The present invention relates to a screen device for displaying an image, in particularly, to a bag type portable screen device in which a screen is equipped with a bag such that the screen is easily assembled to and separated from the bag and has a small volume.

2. Description of the Related Art

A salesman usually carries presentation tools such as a laptop computer, a projector, a screen, and a screen stand for his/her business, and a laptop computer protecting bag and a projector protecting bag are further required to protect the laptop computer and the projector during the carrying of the presentation tools.

Thus, since several presentation tools must be carried simultaneously as described above, the presentation tools, specifically a screen device, are very inconvenient to carry, are very complicated to install and dissemble, and are inconvenient because of a large volume.

Moreover, according to a conventional screen device, a fixed pipe is fixed at the center of the screen device, a spring is installed on the outer circumference of the fixed pipe such that the lateral movement of the spring depends on the fixed pipe when the spring is wound and unrolled, rotary bearings are installed to the lateral sides of the fixed pipe and a rotary rod is further installed on the rotary bearings such that the rotary rod is rotated about the intermediate portion of the fixed pipe by the spring to wind and unroll the screen. Thus, the conventional screen device is relatively strong in comparison to the spring, but its volume is very large due to the complex structure.

Particularly, the conventional rotary rod type screen device is operated by the pressure of the spring and the roll-up movement of the screen is performed by taking the fixed pipe as a base shaft. Thus, if a diameter of the fixed pipe is small, since the horizontal balance of the screen cannot be maintained and the base shaft is bent due to the pressure of the spring, the rotary rod cannot rotate.

Therefore, since the volume of the conventional screen device is much too large to be coupled with a bag.

SUMMARY OF THE INVENTION

Therefore, the present invention has been made in view of the above and/or other problems, and it is an object of the present invention to provide a bag type portable screen device in which, differently from the conventional configuration and operation of a rotation shaft, a diameter of a spring is minimized, a movable ring is eliminated, and an inner fixed pipe is eliminated by substituting a fixed shaft so that a volume of the bag type portable screen device is decreased by ½ to ⅓ of that of the conventional portable screen device.

It is another aspect of the present invention to provide a bag type portable screen device in which a screen is coupled to an outer side of a usual bag so that several types of presentation tools can be easily carried through a single bag.

It is still another aspect of the present invention to provide a bag type portable screen device in which a screen is separated from or coupled with a bag as occasion demands so that it is convenient to carry and to be coupled with various types of bags.

It is still another aspect of the present invention to provide a bag type portable screen device in which a screen of a minimized volume is installed so that it is convenient to carry and to be installed in a bag.

It is still another aspect of the present invention to provide a bag type portable screen device in which a high reflective flat, curved, or spherical screen is installed so that a clean image can be watched in a bright place.

BRIEF DESCRIPTION OF THE DRAWINGS

These and/or other aspects and advantages of the present invention will be come apparent and more readily appreciated from the following description of the embodiments, taken in conjunction with the accompanying drawings, in which.

DESCRIPTION OF THE PREFERRED EMBODIMENTS

A bag type portable screen device according to an embodiment of the present invention, as illustrated in FIG. 1A, is configured such that a screen case 2 having upper and lower sides with which a screen 1 is coupled, is coupled with fixing rings 8 to fix the screen 1 so that the cover 7 of the screen 1, as illustrated in FIG. 1B, is lifted up to be hung on the fixed rings 8 when using the screen 1 and the screen cover 7 is released from the fixed rings 8, as illustrated in FIG. 1A so that the screen 1 is automatically wound for the carrying of the bag type portable screen device.

As described above, as illustrated in FIG. 2, the screen case 2 is attached to the outer lower side of the bag 10, the rotary rod 3 is installed at the center inside the screen case 2, the screen 1 is wound around the rotary rod 3 such that the screen 1 can be unrolled, and the screen cover 7 connected to the screen 1 at the upper end of the screen 1 where the screen 1 is unrolled.

Figure 2:
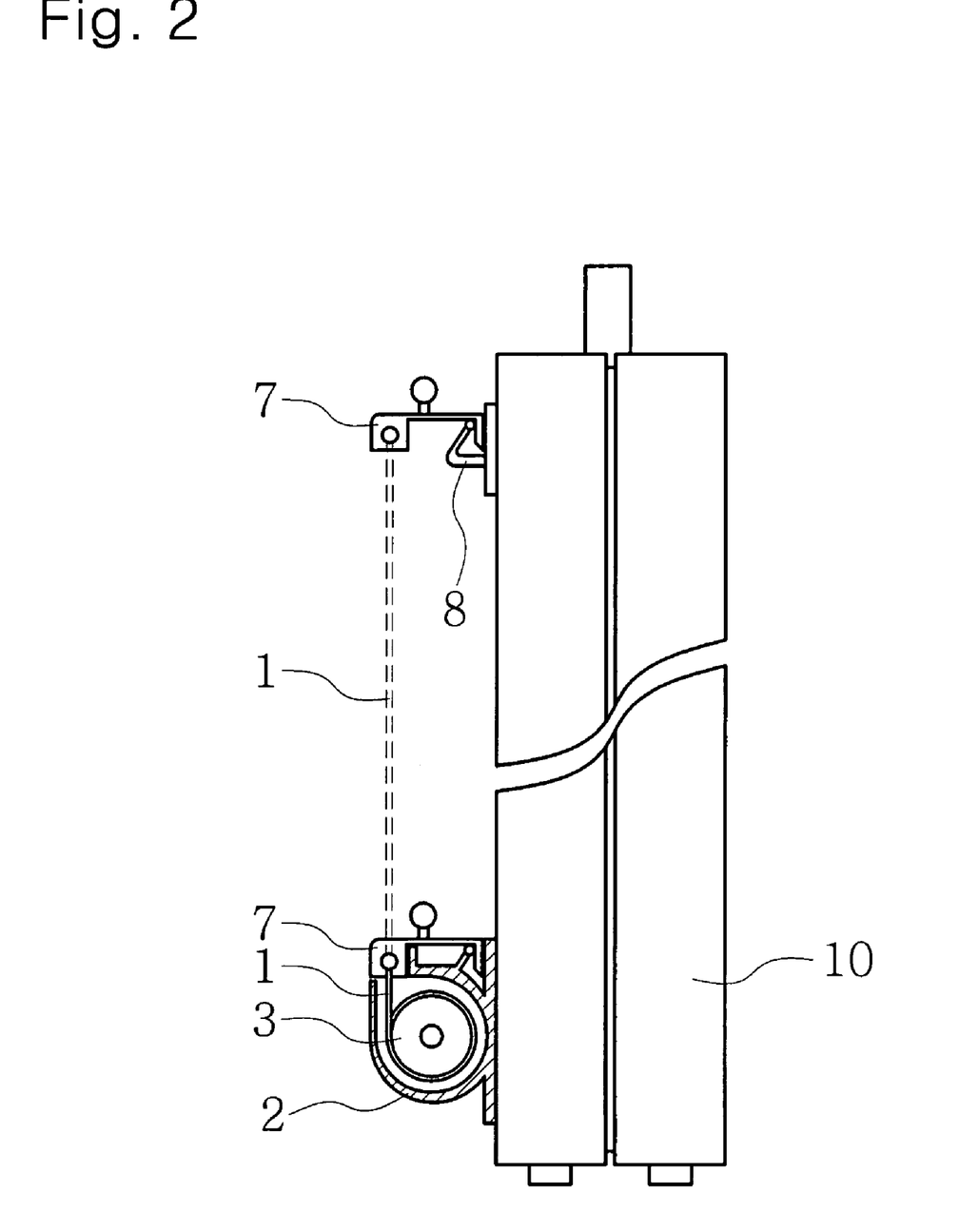
FIG. 2 is a sectional view illustrating a screen of the bag type portable screen device according to the embodiment of the present invention.

The screen cover 7 is hooked on the fixed rings 8 fixed to the upper end of the bag 10 to fix the screen 1 when the screen 1 is used.

As illustrated, the screen case 2 is installed in an upper case of the bag 10 and a recess, into which the rotary rod 3 and the screen 1 are inserted, is formed on the surface of the upper case of the bag 10 to be installed the screen case 2 in the bag 10 so that the screen case can be protected during carrying.

Figure 3:
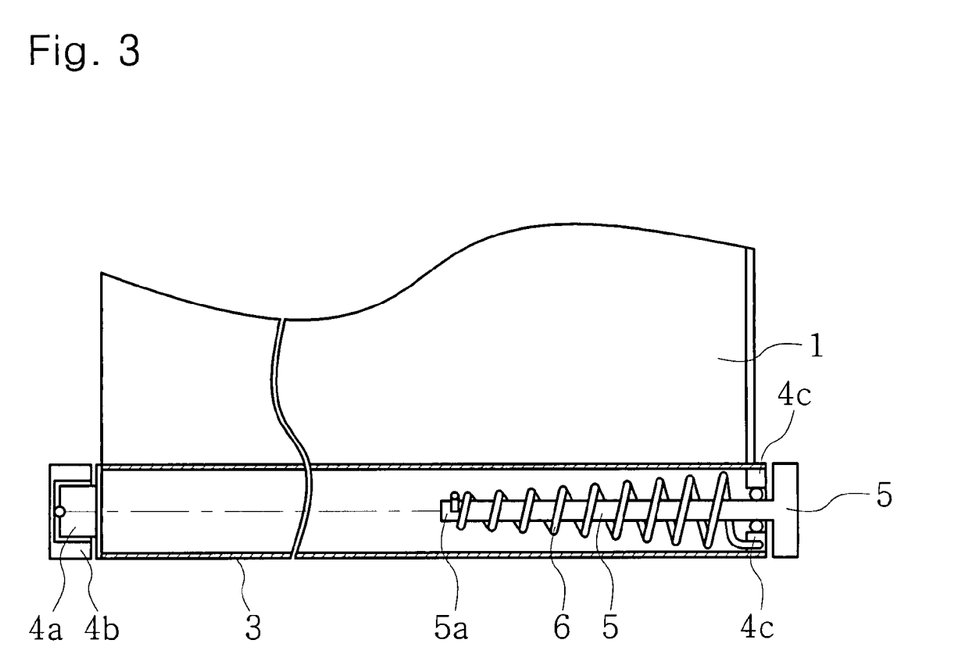
FIG. 3 is a sectional view illustrating a rotary rod employed in the bag type portable screen device according to the embodiment of the present invention.

The rotary rod 3, as illustrated in FIG. 3, is configured such that a rotation housing 4a is installed at the left side of the rotary rod 3, a rotation shaft 4b is inserted into the center of the rotary rod 3 to rotate the rotary rod 3, a rotation housing 4c is installed at the right side of the rotary rod 3, and a groove is formed in the center of the rotation housing 4c such that a center shaft 5a of a center shaft 5 is inserted into the rotary rod 3.

A spring 6 is installed around the center shaft 5a in such a fashion that an end of the spring 6 is fixed to the center shaft 5a and the other end of the spring 6 is fixed to the rotation housing 4c.

The rotary rod 3 rotates when the screen 1 is lifted up such that the spring 6 coupled with the rotation housing 4c is wound by the fixed center shaft 5a, and the spring 6 is unrolled and the screen 1 is automatically wound around the rotary rod 3 when the lifted screen 1 is released.

A fixed pipe with a diameter of 20 mm to 30 mm, employed in the conventional screen device, is substituted with a fixed shaft 5 with a diameter of 3 mm to 15 mm, and due to this, a diameter of 25 mm to 40 mm of a spring employed in the conventional screen device is reduced to 4 mm to 16 mm. As a result, a rotary rod 3 with a diameter of 30 mm to 50 mm, employed in the conventional screen device is substituted with the rotary rod with a diameter of 10 mm to 20 mm. Therefore, a volume of the screen device can be reduced by ½ to ⅓ of the conventional screen device.

However, in this case, although the rotary rod 3 of the conventional screen device is rotated by the fixed pipe, in the bag type portable screen device according to the embodiment of the present invention, the rotation shaft of the rotary rod 3 is rotated by the rotation housing 4a and the fixed shaft 5 so that the horizontally of the rotation shaft can be maintained even when the pressure of the spring 6 is applied and the rotary rod 3 can be rotated within a minimized volume.

Thus, configuration and operation of the rotation shaft 4b are different from that of the conventional screen device such that the diameter of the spring 6 is minimized, a movable ring is eliminated, and the inner fixed pipe is substituted with the fixed shaft 5 to reduce the volume of the bag type portable screen by ½ to ⅓ that of the conventional screen device.

Figure 5:
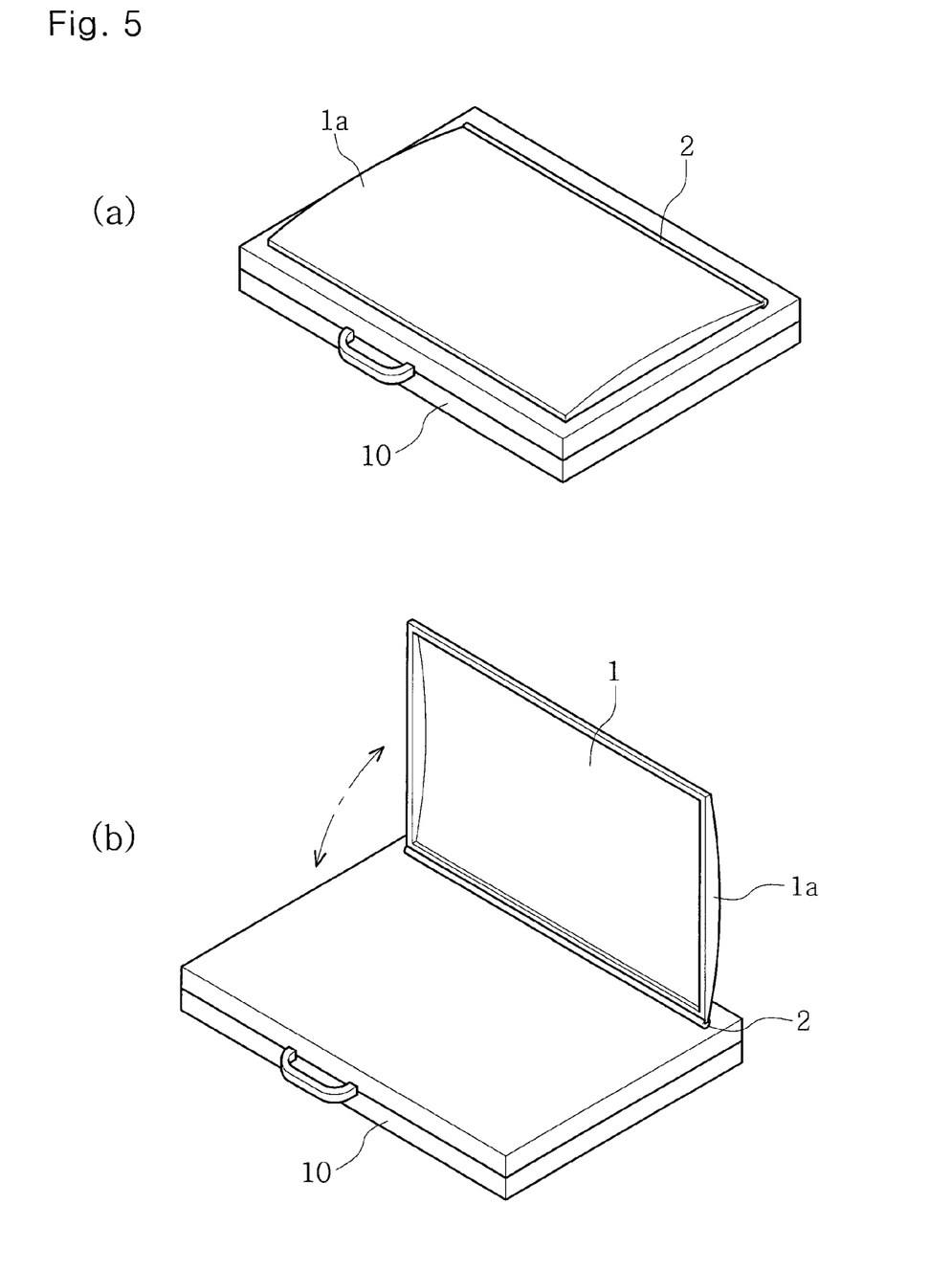
FIG. 5 is a view illustrating an example of an application of the bag type portable screen device according to the embodiment of the present invention.
Figure 6:
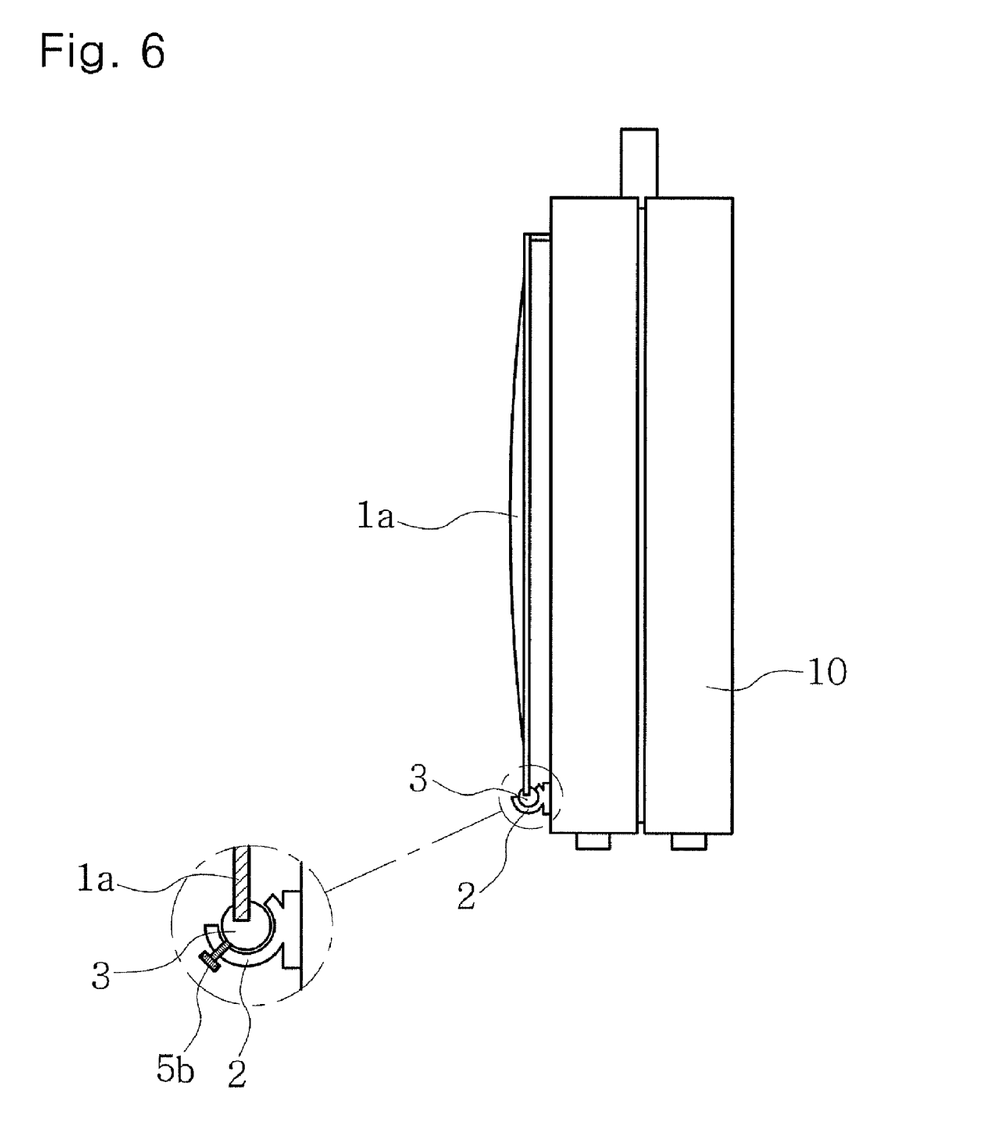
FIG. 6 is a sectional view illustrating the example in FIG. 5.

FIGS. 5A and 5B and FIG. 6 are views illustrating an example of an application of the bag type portable screen device according to the embodiment of the present invention.

The screen case 2 is installed to a lower side of the bag 10 and is coupled with a screen plate 1a made of metal or plastic material to form the screen 1 on the inner side of the screen case 2.

The screen plate 1a is associated with the rotary rod 3 installed in the screen case 2 and a fixing member 5b, as illustrated in FIG. 6, is provided at a side of the screen case 2 to adjust an installation angle of the screen plate 1b.

In the screen device as described above, the screen plate 1a is rotated within the screen case 2 by the rotary rod 3 such that the bag type portable screen device becomes a bag for carrying as illustrated in FIG. 5A and is changed as illustrated in FIG. 5B.

The screen plate 1a may be used as the screen 1 when the inner surface of the screen plate 1a is polished at a proper fineness number.

Particularly, according to the present invention, the screen may be a curved screen or a spherical screen. In this case, a highly reflective screen with brightness three times to thirty times that of usual screens can be obtained. In the bag type portable screen device, since the bag serves as a support of the screen, a stand and a frame of the conventional screen device can be eliminated so that the weight and volume of the bag type portable screen device can be reduced by ½ of those of the conventional screen device.

In other words, it is difficult to form a highly reflective surface on a roll screen because of flexibility of material. However, in examples illustrated in FIGS. 5, 7, and 9, since the screens are fixed types, high reflective hard screens can be obtained. Thus, a three-gain screen with reflectance equal to or greater than 3% to a thirty-gain screen with reflectance of 30% can be obtained.

Next, a coupling device 11 will be described as follows.

There are various types of a bag.

For example, a briefcase, a suitcase, etc.

The bag is made by assembling several tens of components and needs an excessive manufacturing cost of a mold used to manufacture the bag, and the manufacturing of the bag is very complicated.

Thus, in order to install the screen to the various bags, the screen must be easily installed to and separated from the bags.

Figure 4:
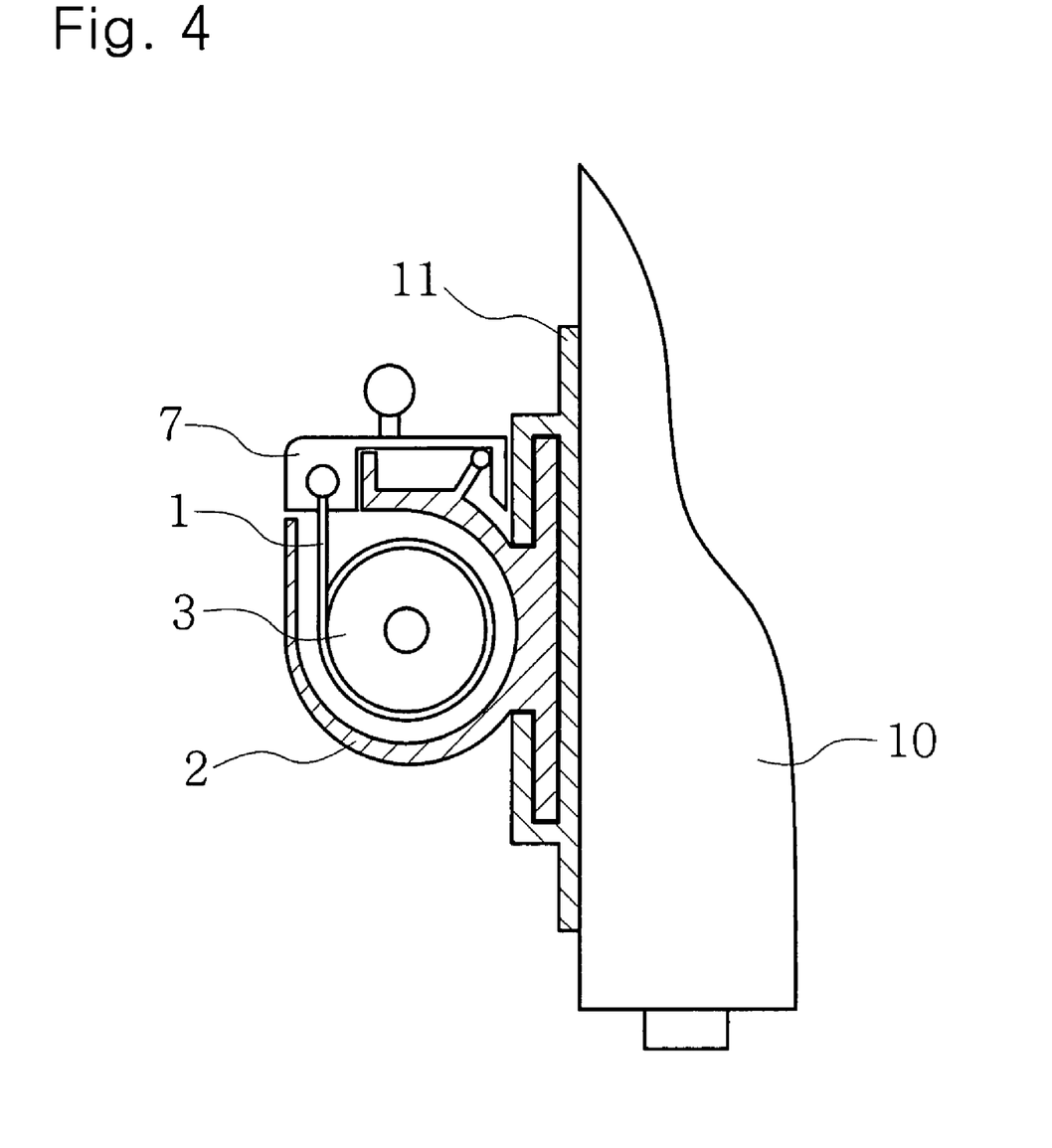
FIG. 4 is a view illustrating a screen coupling unit of the bag type portable screen device according to the preferred embodiment of the present invention.

To this end, as illustrated in FIG. 4, the screen case 2 of the bag type portable screen device according to the present invention is easily coupled with and separated from the bag 10 by the coupling device 11.

In other words, when the coupling device 11 is installed to the lower end of the bag 10 and the fixed rings 8 are attached to the upper end of the bag 10 as illustrated in FIG. 2, the screen case 2 is pushed into the groove of the coupling device 11 to be coupled with the coupling device 11 and moves rightward and leftward as occasion demands to be separated from the bag 10.

Moreover, even when positions of the screen case 2 and the fixed rings 8 are changed into the upper side and the lower side of the bag 10 respectively or the screen plate 1a is opened and closed in the direction of the lower side to the upper side, the same function exhibits.

A bag type portable screen device according to another embodiment of the present invention will be described with reference to FIGS. 7, 8, and 9.

In order to carry out a presentation in a bright place with the bag type portable screen device according to another embodiment of the present invention, the brightness of a screen is very important and to this end the surface of the screen must be a highly reflective surface.

Figure 7:
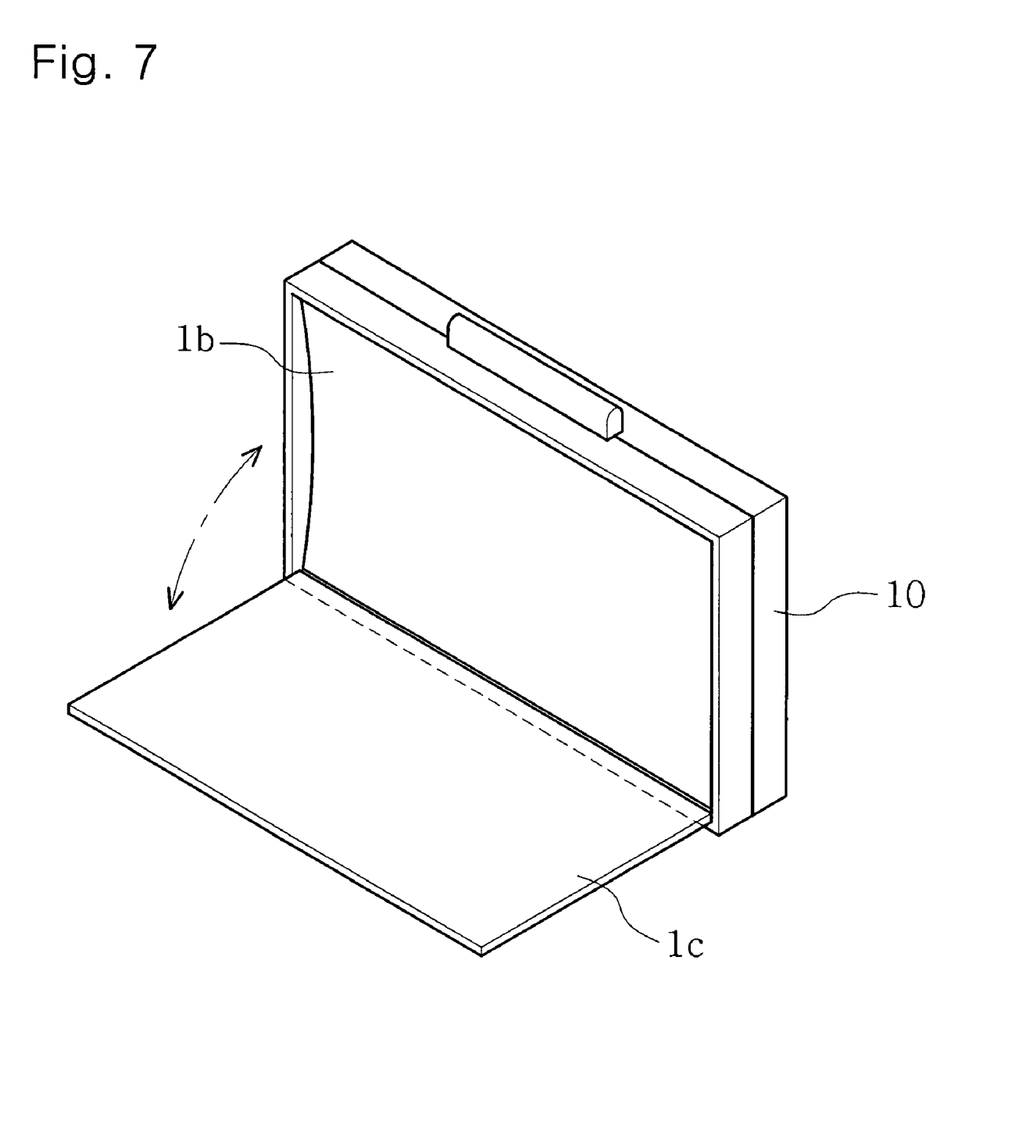
FIG. 7 is a view illustrating another example of an application of the bag type portable screen device according to the embodiment of the present invention.
Figure 8:
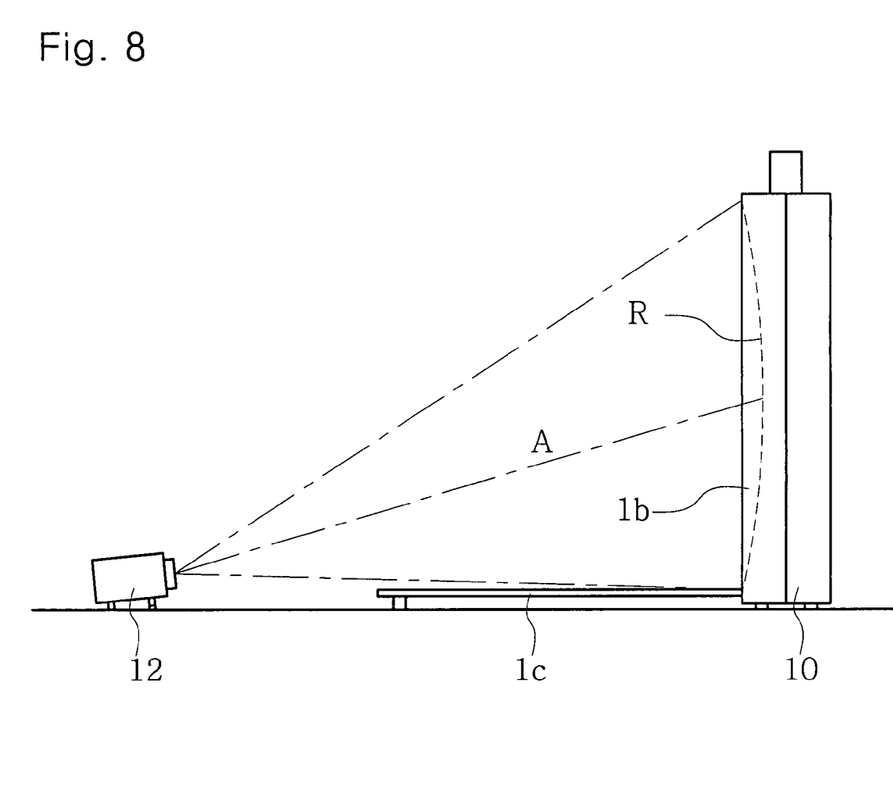
FIG. 8 is a view illustrating operation of the example in FIG. 7.

Thus, in this embodiment of the present invention, in order to form the highly reflective surface, as illustrated in FIGS. 7 and 8, a flat, curved or spherical fixed screen 1b is formed on one of the upper and lower sides of the bag 10, that is, the outer side of the case of the bag 10 is made in the form of the flat, curved or spherical fixed screen 1b.

The above-mentioned fixed screen 1b is made of a metal such as aluminum, a soft material such as plastic and increases reflectance of the surface to obtain a 30 gain highly reflective surface with a reflectance 30%.

However, a hot spot in which a part of the screen is bright is generated as the reflectance is increased. In order to solve the hot spot, as illustrated in FIG. 8, if the fixed screen 1b is made in the form of a curved or spherical screen with a curvature R corresponding to twice a projection distance of the projector 12, although the hot spot generated when the reflectance of a flat screen is increased over three gains, the reflectance can be increased to six gains in the curved screen to form the reflective surface with 6 gains and to thirty gains in the spherical screen to form the reflective surface with 30 gains.

Figure 9:
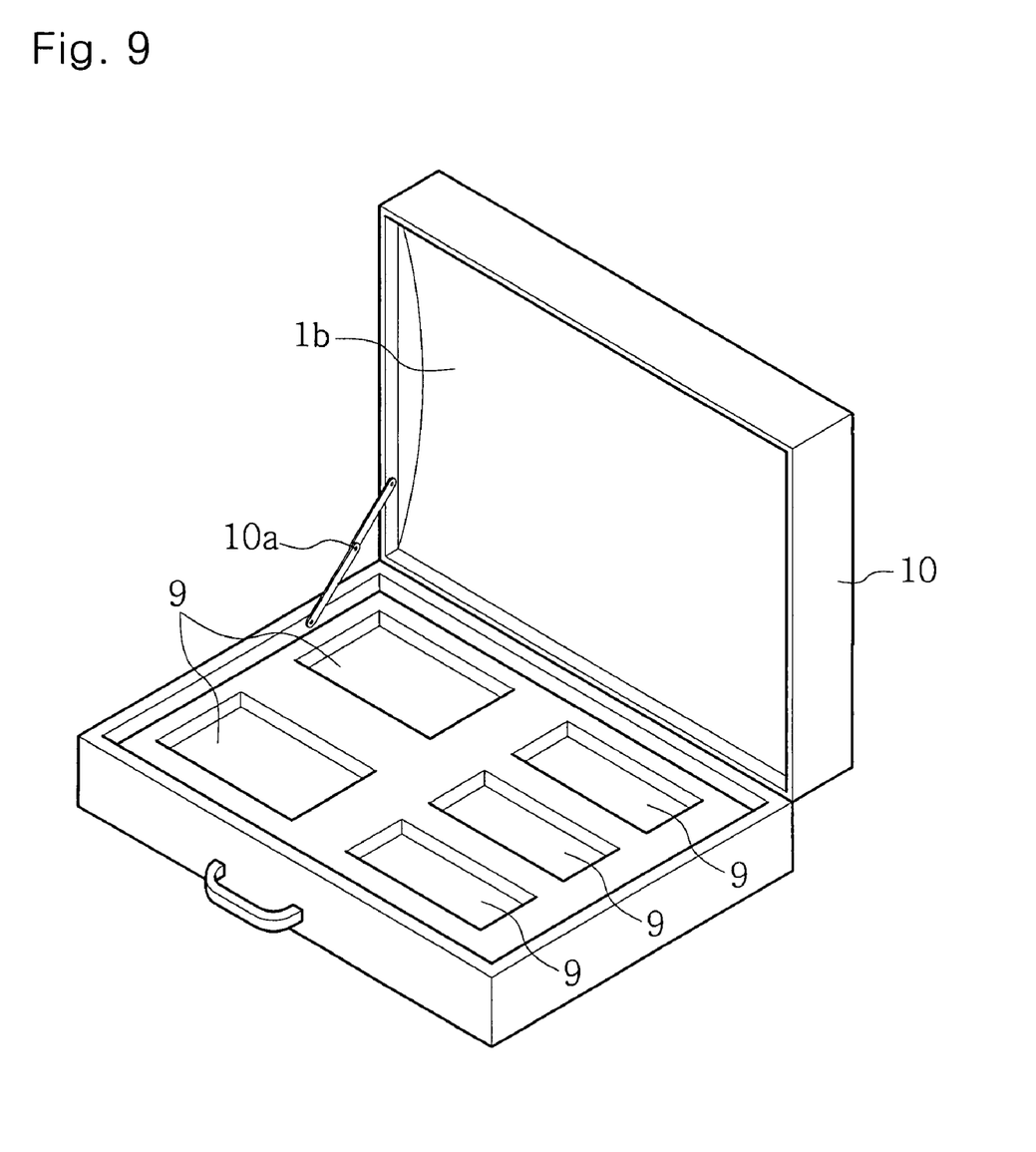
FIG. 9 is a reference view illustrating an inner structure of a bag employed in the bag type portable screen device according to the embodiment of the present invention.

The above-mentioned screen device, as illustrated in FIG. 9, the bag 10 has an upper case and a lower case, the fixed type screen 1b is equipped to one of the cases, and the fixed type screen 1b is coupled with the case by a hinge 10a to pivot upward and downward.

Moreover, the highly reflective fixed type screen 1b is liable to be scratched because of a very soft surface. Thus, as illustrated in FIGS. 7 and 8, a screen protection plate 1c is installed on the surface such that the screen protection plate 1c is opened to use the screen 1b and is closed to carry the screen 1b so that the surface of the fixed screen 1b can be protected.

Thus, in the bag type portable screen device according to this embodiment of the present invention, as illustrated in FIGS. 7 and 9, one of the upper and lower cases of the bag 10 is coupled with the flat, curved, or spherical fixed type screen 1b with a highly reflective surface of three to thirty gains.

According to bag type portable screen device of the present invention, as illustrated in FIGS. 7 and 8, the screen protection plate 1c is coupled with the front side of the fixed type screen 1b such that the screen protection plate 1c can be opened and closed as occasion demands.

FIG. 9 is a reference view illustrating an inner structure of a bag employed in the bag type portable screen device according to the embodiment of the present invention. As illustrated in the drawing, the bag 10 has various recesses 9 into which a laptop computer, a projector, and the like can fit.

Figure 1:
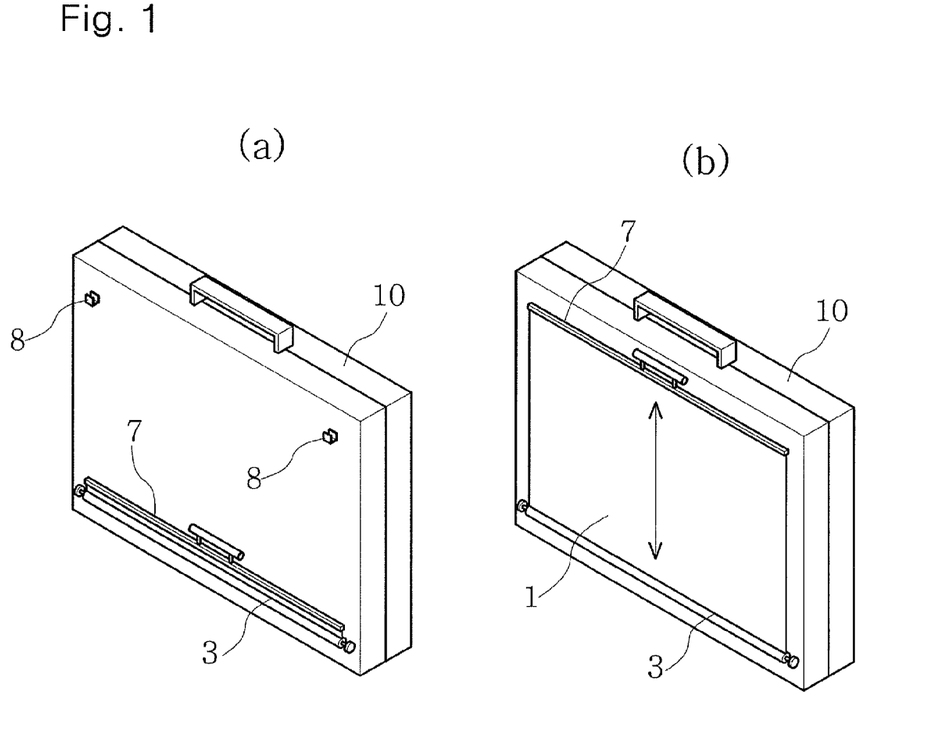
FIG. 1A is a view illustrating a bag type portable screen device according to an embodiment of the present invention in a state of carrying.
FIG. 1B is a view illustrating the bag type portable screen device according to the embodiment of the present invention in a state of using.

In the bag type portable screen device in which the screen case 2 is installed outside the bag 10 as illustrated in FIGS. 1 and 2, since the bag 10 serves as the stand of the screen and a protection bag for the laptop computer and the projector, a user can conveniently carry and keep all the presentation tools in custody with only the bag 10.

Moreover, according to the bag type portable screen device of the present invention, since an additional screen stand and screen to be installed are not needed, it is very convenient to install and withdraw the screen 1.

The screen 1 is installed to the rotary rod 3 of the screen case 2 to be opened and closed or the highly reflective screen such as the fixed type screen 1b with three gains to thirty gains is installed in the screen case 2 so that a user can watch an image three times to thirty times brighter than the image displayed by the conventional screen device.

Moreover, the screen 1 is separated from and assembled in the bag as occasion demands, the bag type portable screen device of the present invention is useful. A part of the bag is made as the fixed type screen 1b so that it is convenient to carry and the overall volume of the fixed type screen device is reduced by ½ to ⅓ in comparison to that of the conventional screen. Thus, even when the fixed screen is installed to the bag 10, it is convenient to install, carry, and use.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A bag type portable screen device comprising:
   a screen case and a rotary rod provided to an outer side of a bag; and
   a fixed type screen plate connected to the rotary rod, and having a reflective surface in the form of a flat, curved, or spherical surface.

2. The bag type portable screen device according to claim 1, further comprising:
   a coupling unit installed in the bag wherein the screen case is provided separately and the coupling unit is provided to the bag such that the screen case can be coupled with and separated from the bag through the coupling unit as occasion demands.

3. The bag type portable screen device according to claim 2, wherein the coupling unit includes a groove into which the screen case can be inserted to couple the screen case with the coupling unit.

4. The bag type portable screen device according to claim 1, further comprising:
   a fixing member provided on a side of the screen case to adjust an installation angle of the fixed type screen plate.

5. The bag type portable screen device according to claim 1, wherein the reflective surface of the fixed type screen plate has a gain from three to thirty.

* * * * *